(12) United States Patent
Tanaka et al.

(10) Patent No.: US 10,136,093 B2
(45) Date of Patent: Nov. 20, 2018

(54) SOLID-STATE IMAGING APPARATUS AND METHOD OF CONTROLLING THE SAME

(71) Applicant: CANON KABUSHIKI KAISHA, Tokyo (JP)

(72) Inventors: Masanori Tanaka, Kawasaki (JP); Nobuhiro Takeda, Yokohama (JP); Teruyuki Okado, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 330 days.

(21) Appl. No.: 14/690,109

(22) Filed: Apr. 17, 2015

(65) Prior Publication Data

US 2015/0304585 A1    Oct. 22, 2015

(30) Foreign Application Priority Data

Apr. 21, 2014   (JP) .................. 2014-087596

(51) Int. Cl.
| | |
|---|---|
| H01L 27/00 | (2006.01) |
| H04N 5/378 | (2011.01) |
| H04N 5/343 | (2011.01) |
| H04N 5/347 | (2011.01) |
| H04N 9/04 | (2006.01) |

(52) U.S. Cl.
CPC ............ *H04N 5/378* (2013.01); *H04N 5/343* (2013.01); *H04N 5/347* (2013.01); *H04N 9/045* (2013.01)

(58) Field of Classification Search
CPC ........ H04N 5/378; H04N 11/00; H04N 9/045; H04N 5/347; H04N 5/343
USPC ..................................... 250/208.1
See application file for complete search history.

(56) References Cited

U.S. PATENT DOCUMENTS

| | | | | |
|---|---|---|---|---|
| 8,194,163 | B2* | 6/2012 | Mabuchi | H04N 5/343 348/272 |
| 2005/0133687 | A1* | 6/2005 | Bock | H01L 27/14609 250/208.1 |
| 2005/0253942 | A1* | 11/2005 | Muramatsu | H04N 9/083 348/273 |
| 2007/0146514 | A1* | 6/2007 | Maeda | H04N 5/3456 348/294 |
| 2009/0057535 | A1* | 3/2009 | Bae | H01L 27/14656 250/208.1 |
| 2010/0079611 | A1* | 4/2010 | Suzuki | H04N 5/374 348/222.1 |

(Continued)

FOREIGN PATENT DOCUMENTS

JP        4723994 B       7/2011

*Primary Examiner* — Thanh Luu
*Assistant Examiner* — Kevin Wyatt
(74) *Attorney, Agent, or Firm* — Cowan, Liebowitz & Latman, P.C.

(57) ABSTRACT

A solid-state imaging apparatus comprises a pixel array, a first column output line provided for each column of the pixel array, a first constant current source, a scanning unit configured to select the pixel portions for each row, and a current control unit configured to control current values, wherein the scanning unit can switch between a normal readout mode and a mixing readout mode, and in the mixing readout mode, the current control unit controls the current values of the first column output lines so that the current value of the first column output line to which the signals of at least one color are simultaneously output is smaller than the current value of the first column output line to which the signals of another color are simultaneously output.

8 Claims, 9 Drawing Sheets

(56) References Cited

U.S. PATENT DOCUMENTS

2010/0253821 A1* 10/2010 Yamamoto .............. H03K 4/02
  348/294
2011/0074994 A1*  3/2011 Wakabayashi ...... H03M 1/0658
  348/302
2011/0134297 A1*  6/2011 Takeda ................ H04N 5/3742
  348/302
2011/0194001 A1*  8/2011 Eki ..................... H04N 5/3456
  348/294

* cited by examiner

SOLID-STATE IMAGING APPARATUS AND METHOD OF CONTROLLING THE SAME

BACKGROUND OF THE INVENTION

Field of the Invention

The present invention relates to a solid-state imaging apparatus and a method of controlling the same.

Description of the Related Art

Along with an increase in number of pixels of an image sensor such as a CMOS sensor in a recent digital camera, there is an increasing need for high-frame rate shooting of outputting 1920×1080 pixels at 30 fps or 60 fps like a full HD movie.

To meet this need, a pixel mixing method of mixing pixel output signals is known as a method of decreasing the number of pixels for implementing high-frame rate shooting by a CMOS image sensor with a large number of pixels by switching a driving method. In the pixel mixing method, the frame rate is increased by decreasing the data rate by mixing and outputting a plurality of pixels in a specific cycle in the CMOS image sensor.

A pixel mixing method disclosed in Japanese Patent No. 4723994 mixes and outputs pixel signals on a plurality of rows by causing a row selection circuit to simultaneously select and output a plurality of pixel rows. According to Japanese Patent No. 4723994, it is possible to mix and output pixel signals without increasing the power consumption, as compared with a method of averaging signals in the vertical direction using conventional capacitors.

However, when the method described in Japanese Patent No. 4723994 is used, as the output difference between a plurality of pixels whose pixel signals are to be mixed and output is larger, the linearity of the output with respect to the input may not be maintained.

The problem that the linearity is not maintained arises especially for an object having high contrast and high-frequency stripes at the time of actual imaging. If, for example, an object on which a black and white pattern is repeated at a high frequency is imaged by a CMOS image sensor in which color filters of two or more different colors are periodically arranged in respective pixels, the linearity is sequentially lost from a pixel of a color which processes a larger signal amount. If the input/output linearity is lost, a false color is output, thereby degrading the image quality. If the input/output linearity cannot be maintained, a method of uniformly increasing the current values of all pixels which output signals is plausible. However, this method increases the power consumption.

SUMMARY OF THE INVENTION

The present invention has been made in consideration of the above-described problems, and provides a method of decreasing the number of pixels for suppressing degradation in image quality when imaging an object having high contrast and high-frequency stripes while suppressing an increase in power consumption.

According to the first aspect of the present invention, there is provided a solid-state imaging apparatus comprising: a pixel array in which a plurality of pixel portions each configured to output a photo-electrically converted signal are arrayed two-dimensionally, and a color filter is provided in each of the plurality of pixel portions; a first column output line provided for each column of the pixel array; a first constant current source configured to supply a current for each of the first column output lines; a scanning unit configured to select the pixel portions for each row, and control output of signals from the selected pixel portions to the first column output lines; and a current control unit configured to control current values of the first column output lines for respective colors of the color filters, wherein the scanning unit can switch between a normal readout mode in which the pixel portions are selected for each row and the signals of the pixel portions on the selected row are output to the first column output lines and a mixing readout mode in which the pixel portions are selected for a plurality of rows and the signals of the plurality of pixel portions with the color filters of the same color are simultaneously output to the first column output line, and in the mixing readout mode, the current control unit controls the current values of the first column output lines so that the current value of the first column output line to which the signals of the plurality of pixel portions of at least one color are simultaneously output is smaller than the current value of the first column output line to which the signals of the plurality of pixel portions of another color are simultaneously output.

According to the second aspect of the present invention, there is provided a method of controlling a solid-state imaging apparatus including a pixel array in which a plurality of pixel portions each configured to output a photo-electrically converted signal are arrayed two-dimensionally and a color filter is provided in each of the plurality of pixel portions, a first column output line provided for each column of the pixel array, and a first constant current source configured to supply a current for each of the first column output lines, the method comprising: a scanning step of selecting the pixel portions for each row, and controlling output of signals from the selected pixel portions to the first column output lines; and a current control step of controlling current values of the first column output lines for respective colors of the color filters, wherein in the scanning step, it is possible to switch between a normal readout mode in which the pixel portions are selected for each row and the signals of the pixel portions on the selected row are output to the first column output lines and a mixing readout mode in which the pixel portions are selected for a plurality of rows and the signals of the plurality of pixel portions with the color filters of the same color are simultaneously output to the first column output line, and in the current control step, in the mixing readout mode, the current values of the first column output lines are controlled so that the current value of the first column output line to which the signals of the plurality of pixel portions of at least one color are simultaneously output is smaller than the current value of the first column output line to which the signals of the plurality of pixel portions of another color are simultaneously output.

Further features of the present invention will become apparent from the following description of exemplary embodiments with reference to the attached drawings.

DESCRIPTION OF THE EMBODIMENTS

Embodiments of the present invention will be described in detail below with reference to the accompanying drawings.

First Embodiment

The first embodiment of the present invention will be explained below with reference to FIGS. 1 to 4.

Figure 1:
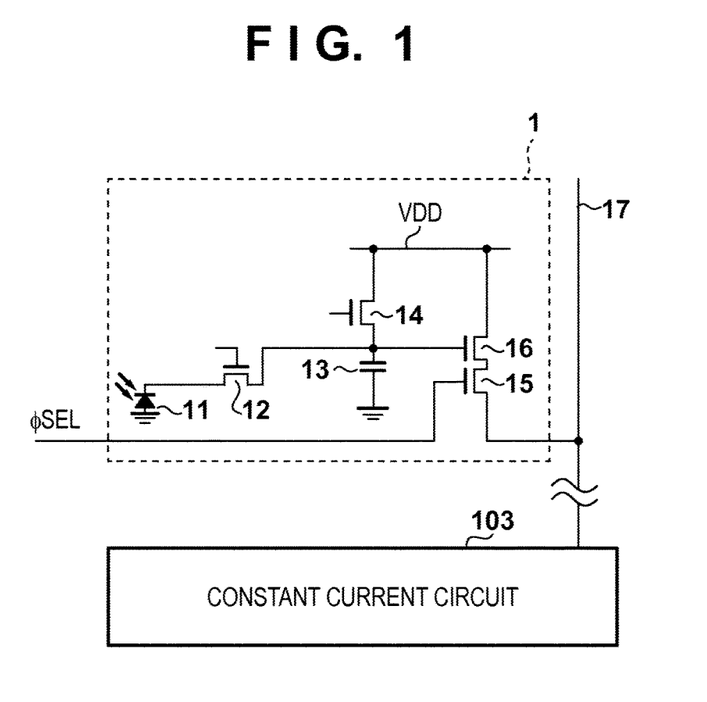
FIG. 1 is a circuit diagram showing the arrangement of a pixel circuit according to the first embodiment of the present invention.

FIG. 1 shows the arrangement of a pixel circuit 1 (pixel portion) according to this embodiment. Referring to FIG. 1, the pixel circuit 1 includes a photodiode 11, a transfer switch 12, a floating diffusion (FD) 13, a reset switch 14, a row selection switch 15, and an amplification transistor 16. The photodiode 11 generates and accumulates charges corresponding to the amount of incident light by photo-electric conversion. The charges accumulated in the photodiode 11 are transferred to the FD 13 by turning on the transfer switch 12.

By turning on the reset switch 14, unnecessary charges accumulated in the FD 13 are reset. The row selection switch 15 is controlled by a signal φSEL from a vertical scanning circuit 102 (scanning unit) (to be described later), and controls connection to a column output line 17 provided for each pixel column. The amplification transistor 16 on a row selected by the row selection switch 15 is driven by a constant current circuit 103 (to be describe later) via the column output line 17, and outputs data according to a signal input to a gate. Each of the transfer switch 12, reset switch 14, and row selection switch 15 is formed from a MOS transistor, and is turned on by setting the gate level at high level.

The arrangement of a CMOS image sensor 100 (solid-state imaging apparatus) will be described with reference to FIG. 2.

In a pixel array 101, a plurality of pixel circuits are arrayed in a matrix, and a color filter is arranged on each pixel circuit. Referring to FIG. 2, reference symbols R, Gr, Gb, and B denote color filters of different colors. Note that the color filters Gr and Gb may be of the same color. In the pixel array 101 shown in FIG. 2, among the pixel circuits arrayed in a matrix (two-dimensionally), pixel circuits on the eight rows from the nth row are shown. Furthermore, in the pixel array 101 shown in FIG. 2, the color filters on the nth row are the color filters R and Gr.

Figure 2:
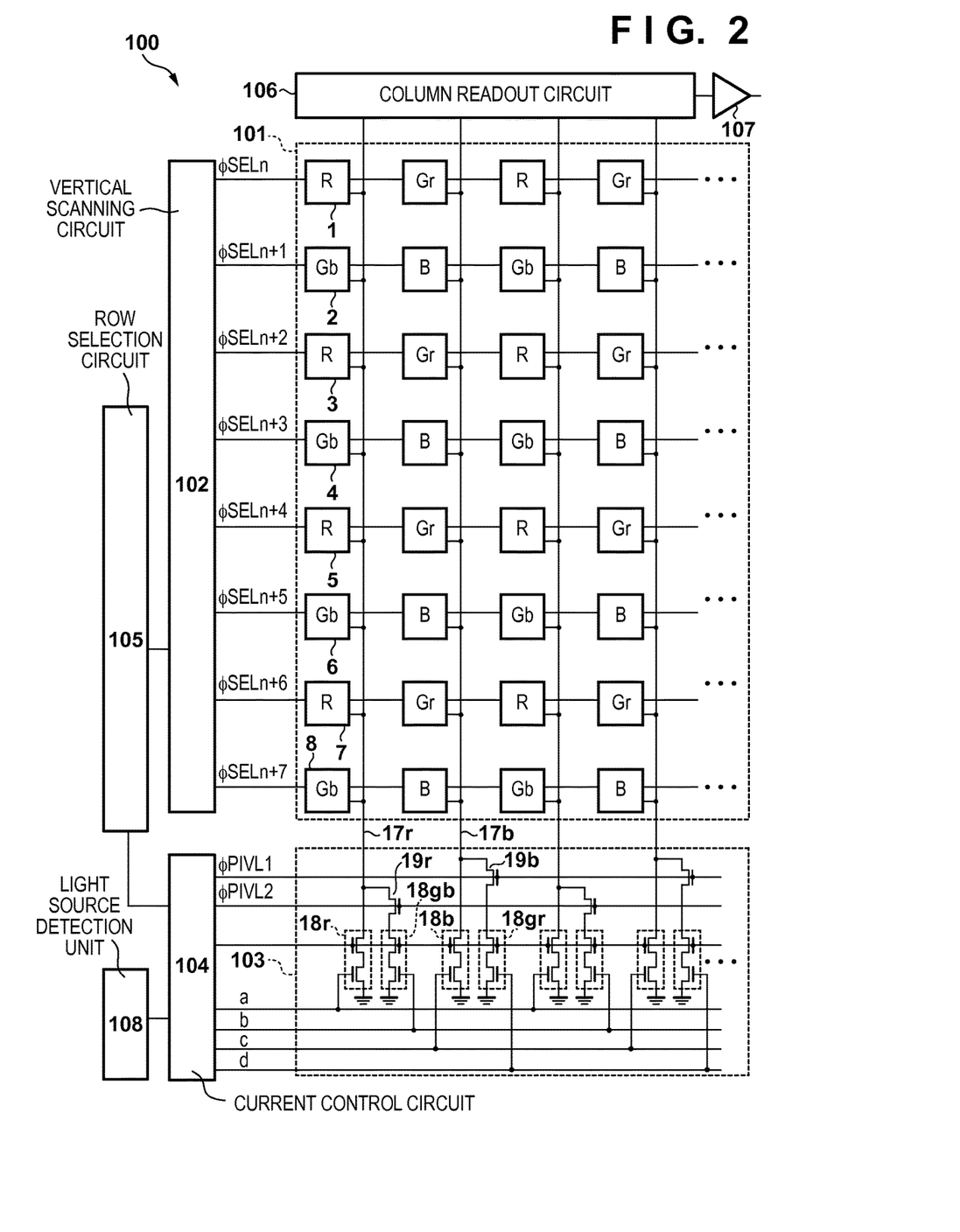
FIG. 2 is a circuit diagram showing the arrangement of a CMOS image sensor according to the first embodiment.

The circuit arrangement of each pixel circuit shown in FIG. 2 is the same as that shown in FIG. 1. However, different reference numerals are given for the respective rows to discriminate between the rows. Pixel circuits 1 to 8 correspond to the nth to (n+7)th rows, respectively. For example, the pixel circuits 3 correspond to the (n+2)th row and the pixel circuits 7 correspond to the (n+6)th row. Furthermore, the column output line 17 provided for an R-Gb pixel column will be referred to as a "column output line 17r" hereinafter, and the column output line 17 provided for a Gr-B pixel column will be referred to as a "column output line 17b" hereinafter.

The vertical scanning circuit 102 selects pixel circuits for each row, and controls signal output. The constant current circuit 103 includes two load constant current sources 18r and 18gb for each column output line 17r and two load constant current sources 18b and 18gr for each column output line 17b. The load constant current source 18r is connected to the column output line 17r, and the load constant current source 18gb is connected to the column output line 17r via a current selection switch 19r. Similarly, the load constant current source 18b is connected to the column output line 17b, and the load constant current source 18gr is connected to the column output line 17b via a current selection switch 19b. A current control circuit 104 supplies a common driving signal φPIVL2 to the current selection switches 19r and a common driving signal φPIVL1 to the current selection switches 19b, thereby driving the switches.

A row selection circuit 105 controls a row to be selected by the vertical scanning circuit 102, and has a normal (non-mixing) readout mode of sequentially selecting the rows one by one, and a mixing readout mode of simultaneously selecting a plurality of rows with color filters of the same colors. In the normal readout mode, the current control circuit 104 (current control unit) controls the current values of the load constant current sources 18r and 18b via control lines a and c using an arbitrary current value Is, respectively, and turns off the current selection switches 19r and 19b. In the mixing readout mode, the current control circuit 104 controls the current values of the load constant current sources 18r, 18gb, 18b, and 18gr via the control line a, a control line b, the control line c, and a control line d using current values Iw, Ix, Iy, and Iz, respectively.

The current control circuit 104 drives the current selection switches 19r and 19b according to the colors of a row selected by the row selection circuit 105. The current value of the column output line 17r when the current selection switch 19r is OFF (non-connection) and that when the current selection switch 19r is ON (connection) are Iw and Iw+Ix, respectively. In addition, the current value of the column output line 17b when the current selection switch 19b is OFF and that when the current selection switch 19b is ON are Iy and Iy+Iz, respectively.

A column readout circuit 106 reads out signals output to the column output lines 17 for each column, and sequentially outputs the signals outside the CMOS image sensor 100 via a readout amplifier 107. A light source detection unit 108 detects the output ratio of an R pixel to a Gb pixel and the output ratio of a B pixel to a Gr pixel at the time of imaging.

In above detection processing, it is preferable to acquire the output ratios by referring to the output ratio of the R pixel to the Gb pixel and the output ratio of the B pixel to the Gr pixel in an area, in which signal amounts are large, of an image obtained in advance by imaging an object for one frame in the normal readout (non-mixing) mode. A case in which the light source detection unit 108 uses the above detection method will be described below.

Note that in the above detection method, an object may be imaged in the mixing readout mode. Alternatively, the output ratios may be acquired by providing a color detection circuit in the light source detection unit 108. In this case, the light source detection unit 108 may be arranged outside the CMOS image sensor 100. By using the fact that the outputs of G pixels tend to be large for a general object, the light source detection unit 108 may be omitted and output ratios decided in advance may be used. Note that the output ratio of the R pixel to the Gb pixel and the output ratio of the B pixel to the Gr pixel, which are detected by the light source detection unit 108, will be respectively referred to as an R/Gb ratio and a B/Gr ratio hereinafter.

In the mixing readout mode, the current control circuit 104 decides the current values Iw, Ix, Iy, and Iz according to the R/Gb ratio and B/Gr ratio obtained by the light source detection unit 108. Note that a case in which the electric current consumption is made equal to that in the normal readout mode by assigning the current values so as to satisfy relationships of Is=Iw+(Ix/2) and Is=Iy+(Iz/2) will be explained. The present invention, however, is not limited to this. An assignment method will be described in detail later with reference to FIG. 4.

Figure 3A:
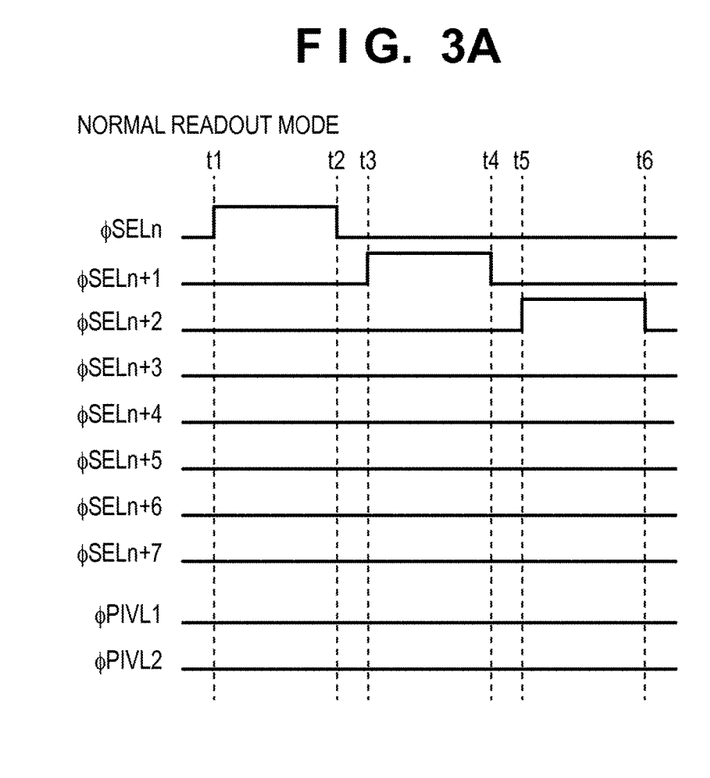
FIGS. 3A and 3B are timing charts showing driving of the CMOS image sensor according to the first embodiment.

A driving example in the normal readout mode using the CMOS image sensor 100 will be described with reference to FIG. 3A. Note that "the signal ϕSEL on the nth row" will be referred to as "a signal ϕSELn" by adding an index n hereinafter.

During a period from time t1 to time t2, the vertical scanning circuit 102 sets the signal ϕSELn at high level to turn on row selection switch 15 of the pixel circuits 1. During this period, the pixel signals of the pixel circuits on the nth row are output to the column output lines 17, and the current control circuit 104 controls the current values supplied to the column output lines 17 to the current value Is via the control lines a and c, respectively. The pixel signals output to the column output lines 17 are read out by the column readout circuit 106, and then sequentially read out via the readout amplifier 107.

During a next period from time t3 to time t4, the vertical scanning circuit 102 sets a signal ϕSELn+1 at high level to turn on row selection switches 15 of the pixel circuits 2. During this period, the pixel signals of the pixel circuits on the (n+1)th row are output to the column output lines 17, and the current control circuit 104 controls the current values supplied to the column output lines 17 to the current value Is via the control lines a and c, respectively. After that, the pixel signals of the pixel circuits on the (n+2)th and (n+3)th rows are continuously output in the same manner.

Figure 3B:
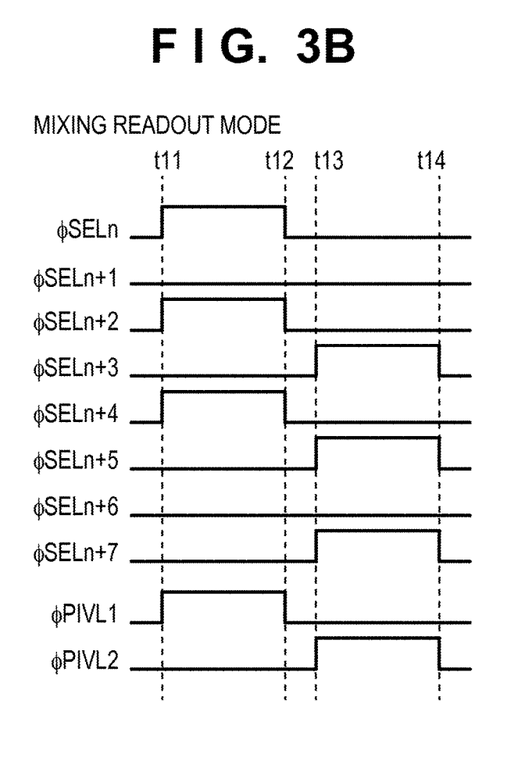

Driving in the mixing readout mode using the CMOS image sensor 100 will be described by using an example of mixing output of three pixels with reference to FIG. 3B. Note that a case in which the light source detection unit 108 detects the R/Gb ratio and B/Gr ratio both of which are equal to or less than 1 will be explained.

During a period from time t11 to time t12, the vertical scanning circuit 102 sets the signal ϕSELn and signals ϕSELn+2 and ϕSELn+4 at high level to turn on the row selection switches 15 of the pixel circuit 1 and row selection switches 15 of the pixel circuits 3 and 5. During this period, the pixel signals of the pixel circuits on the nth, (n+2)th, and (n+4)th rows are mixed and output to the column output lines 17. The current control circuit 104 controls the current values of the load constant current sources 18r, 18b, and 18gr to Iw, Iy, and Iz via the control lines a, c, and d, respectively.

During the period from time t11 to time 12, the current control circuit 104 also sets the signal ϕPIVL1 at high level to turn on the current selection switches 19b, thereby setting the current value of each column output line 17r to Iw and the current value of each column output line 17b to (Iy+Iz). Note that the pixel signals mixed and output to the column output lines 17 during this period are read out by the column readout circuit 106, and then sequentially read out via the readout amplifier 107.

During a next period from time t13 to time t14, the vertical scanning circuit 102 sets signals ϕSELn+3, ϕSELn+5, and ϕSELn+7 at high level to turn on row selection switches 15 of the pixel circuits 4, 6, and 8. During this period, the pixel signals of the pixels circuits on the (n+3)th, (n+5)th, and (n+7)th rows are mixed and output to the column output lines 17. The current control circuit 104 controls the current values of the load constant current sources 18r, 18gb, and 18b to Iw, Ix, and Iy via the control lines a, b, and c, respectively.

During the period from time t13 to time t14, the current control circuit 104 also sets the signal ϕPIVL2 at high level to turn on the current selection switches 19r, thereby setting the current value of each column output lines 17r to Iw+Ix and the current value of each column output line 17b to Iy.

After that, in the same manner, the signal ϕPIVL1 is set at high level while the row selection circuit 105 selects a plurality of R-Gr rows, and is set at low level while the row selection circuit 105 selects a plurality of Gb-B rows. Furthermore, the signal ϕPIVL2 is set at low level while the row selection circuit 105 selects a plurality of R-Gr rows, and is set at high level while the row selection circuit 105 selects a plurality of Gb-B rows.

By setting Is=Iw+(Ix/2), the current value of each column output line 17r at the time of reading out the R pixels is set to Iw=Is−(Ix/2), and the current value of each column output line 17r at the time of reading out the Gb pixels is set to Iw+Ix=Is+(Ix/2). Furthermore, by setting Is=Iy+(Iz/2), the current value of each column output line 17b at the time of reading out the Gr pixels is set to Iy+Iz=Is+(Iz/2), and the current value of each column output line 17b at the time of reading out the B pixels is set to Iy=Is−(Iz/2).

With the above processing, the current values of the column output lines 17r and 17b in the mixing readout mode are equal to those in the normal readout mode. On the other hand, in the mixing readout mode, the input/output linearity of the Gb pixel having a large signal amount is prioritized by decreasing the current value used to read out the R pixels by Ix/2 and increasing the current value used to read out the Gb pixels by Ix/2 in accordance with the R/Gb ratio equal to or less than 1.

Similarly, in the mixing readout mode, the input/output linearity of the Gr pixel having a large signal amount is prioritized by decreasing the current value used to read out the B pixels by Iz/2 and increasing the current value used to read out the Gr pixels by Iz/2 in accordance with the B/Gr ratio equal to or less than 1. Conversely, even if the current values used to read out the R pixels and B pixels with small signal amounts are decreased, there is a small influence of degradation in image quality.

That is, it is possible to suppress an increase in power consumption by assigning the current values at the time of outputting the signals of the Gr or Gb pixels with large signal amounts and the signals of the R or B pixels with small signal amounts, instead of uniformly increasing the current values.

Note that in this embodiment, a case in which Is=Iw+(Ix/2) is set has been explained. However, an operation of changing the current value of each column output line 17r depending on whether the signals of the R pixels or the signals of the Gb pixels are output is the main point of this embodiment. The present invention is not limited to the above relationship. The same applies to the relationship of Is=Iy+(Iz/2).

In the above driving example, a case in which the light source detection unit 108 detects that both the R/Gb ratio and the B/Gr ratio are equal to or less than 1 has been explained. However, the R/Gb ratio and the B/Gr ratio take various values depending on a type of light source or the spectral characteristic of the CMOS image sensor 100.

Furthermore, if the signal amount of an image acquired for light source detection is small to the extent that it is impossible to ignore the influence of noise, or is extremely saturated, it may be impossible to detect the R/Gb ratio and B/Gr ratio.

Examples of driving of the current control circuit 104 for various R/Gb ratios and various B/Gr ratios will be described with reference to a flowchart shown in FIG. 4.

Figure 4:
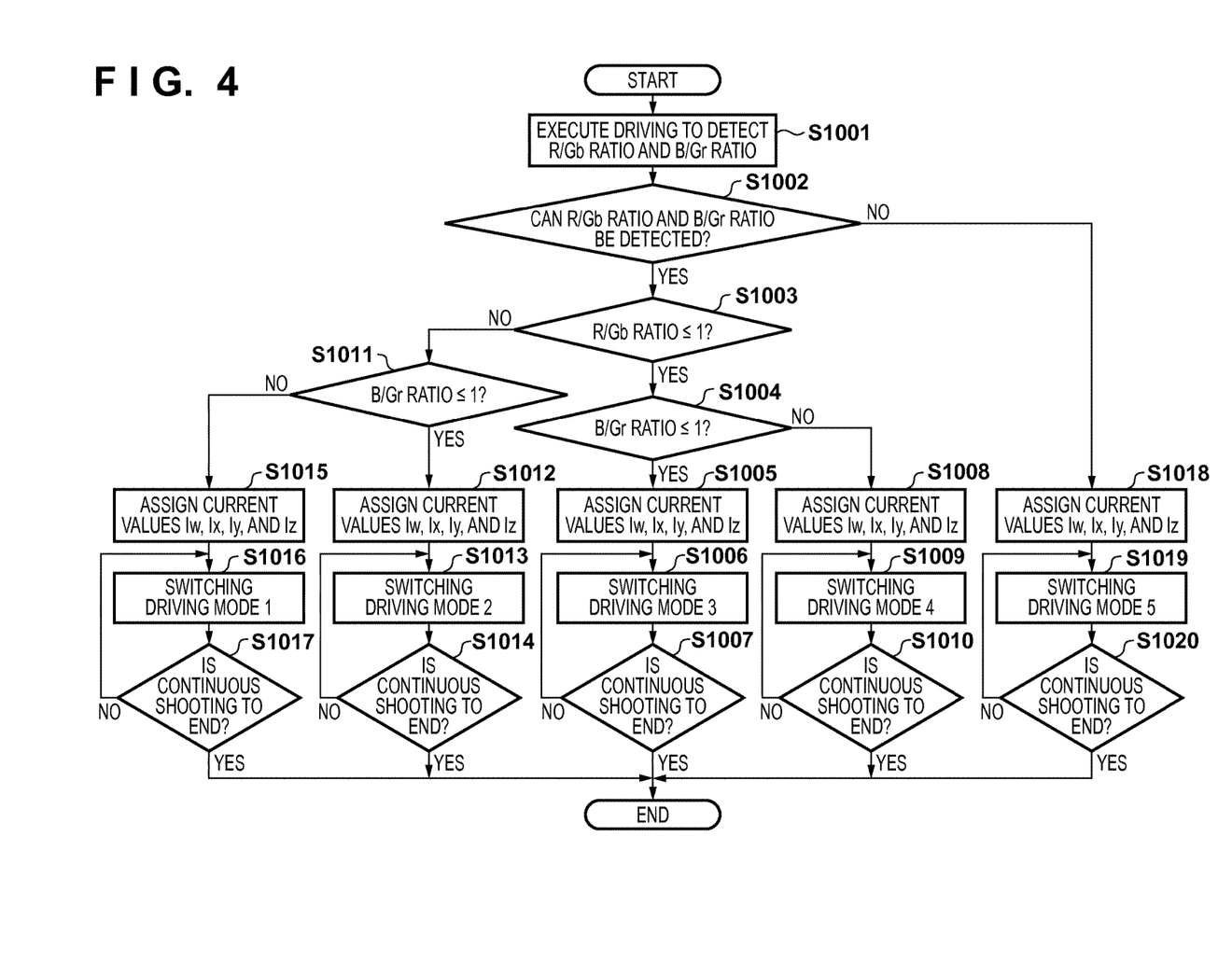
FIG. 4 is a flowchart illustrating control of a current control circuit according to the first embodiment.

FIG. 4 is a flowchart illustrating control of the current values of the column output lines 17r and 17b by the current control circuit 104 in accordance with the R/Gb ratio and B/Gr ratio detected by the light source detection unit 108.

In step S1001, the light source detection unit 108 executes driving to acquire the R/Gb ratio and B/Gr ratio. In step S1002, the light source detection unit 108 determines whether the R/Gb ratio and B/Gr ratio can be detected from an image acquired in step S1001. If it is determined that the R/Gb ratio and B/Gr ratio of the light source can be detected, the process transits to step S1003; otherwise, the process transits to step S1018.

In step S1003, it is determined whether the detected R/Gb ratio of the light source is equal to or less than 1. If the R/Gb ratio is equal to or less than 1, that is, the signal amount of the Gb pixel is larger than that of the R pixel, the process transits to step S1004; otherwise, the process transits to step S1011.

In step S1004, it is determined whether the detected B/Gr ratio of the light source is equal to or less than 1. If the B/Gr ratio is equal to or less than 1, that is, the signal amount of the Gr pixel is larger than that of the B pixel, the process transits to step S1005; otherwise, the process transits to step S1008.

In step S1005, the current values Iw, Ix, Iy, and Iz of the load constant current sources 18r, 18gb, 18b, and 18gr are assigned to satisfy Is=Iw+(Ix/2) and Is=Iy+(Iz/2), and the process transits to step S1006.

In step S1006, the row selection circuit 105 outputs pixel signals in the mixing readout mode, and the current control circuit 104 drives the current selection switches 19r and 19b in switching driving mode 3. The process transits to step S1007. Note that in switching driving mode 3, while the row selection circuit 105 selects a plurality of R-Gr rows, the current selection switches 19r are turned off and the current selection switches 19b are turned on. On the other hand, while the row selection circuit 105 selects a plurality of Gb-B rows, the current selection switches 19r are driven to be turned on and the current selection switches 19b are driven to be turned off.

In step S1007, it is determined whether to continuously acquire a next image. If a next image is continuously acquired, the process returns to step S1006; otherwise, the mixing readout mode ends. On the other hand, in step S1008, the current values Iw, Ix, Iy, and Iz of the load constant current sources 18r, 18gb, 18b, and 18gr are assigned to satisfy Is=Iw+(Ix/2) and Is=Iy+(Iz/2). The process then transits to step S1009.

In step S1009, the row selection circuit 105 outputs pixel signals in the mixing readout mode, and the current control circuit 104 drives the current selection switches 19r and 19b in switching driving mode 4. The process transits to step S1010. Note that in switching driving mode 4, while the row selection circuit 105 selects a plurality of R-Gr rows, the current selection switches 19r and 19b are turned off. On the other hand, while the row selection circuit 105 selects a plurality of Gb-B rows, the current selection switches 19r and 19b are driven to be turned on.

In the above driving operation, if the color filters Gr and Gb are of the same color, the current value of the column output line 17 at the time of outputting the signals of the Gr pixels is different from that at the time of outputting the signals of the Gb pixels. If it is preferable to prioritize processing of making the current value of the column output line at the time of outputting the signals of the Gr pixels equal to that at the time of outputting the signals of the Gb pixels, the current selection switches 19r are turned off and the current selection switches 19b are turned on while the row selection circuit 105 selects a plurality of R-Gr rows. On the other hand, while the row selection circuit 105 selects a plurality of Gb-B rows, the current selection switches 19r and 19b are driven to be turned on. With this processing, driving may be executed only when the signal amount of the G pixel is larger than that of the R pixel.

Alternatively, while a plurality of R-Gr rows are selected, the current selection switches 19r and 19b are turned off. On the other hand, while a plurality of Gb-B rows are selected, the current selection switches 19r are driven to be turned off and the current selection switches 19b are driven to be turned on. With this processing, driving may be executed only when the signal amount of the G pixel is smaller than that the B pixel.

In step S1010, it is determined whether to continuously acquire a next image. If a next image is continuously acquired, the process returns to step S1009; otherwise, the mixing readout mode ends.

In step S1011, it is determined whether the detected B/Gr ratio of the light source is equal to or less than 1. If the B/Gr ratio is equal to or less than 1, the process transits to step S1012; otherwise, the process transits to step S1015. In step S1012, the current values Iw, Ix, Iy, and Iz of the load constant current sources 18r, 18gb, 18b, and 18gr are assigned to satisfy Is=Iw+(Ix/2) and Is=Iy+(Iz/2). Then, the process transits to step S1013.

In step S1013, the row selection circuit 105 outputs pixel signals in the mixing readout mode, and the current control circuit 104 drives the current selection switches 19r and 19b in switching driving mode 2. The process transits to step S1014. Note that in switching driving mode 2, while the row selection circuit 105 selects a plurality of R-Gr rows, the current selection switches 19r and 19b are turned on. On the other hand, while the row selection circuit 105 selects a plurality of Gb-B rows, the current selection switches 19r and 19b are driven to be turned off.

If it is preferable to prioritize processing of making the current value of the column output line at the time of outputting the signals of the Gr pixels equal to that at the time of outputting the signals of the Gb pixels, the current selection switches 19r are turned on and the current selection switches 19b are turned off while a plurality of R-Gr rows are selected. While a plurality of Gb-B rows are selected, the current selection switches 19r and 19b are driven to be turned off. With this processing, driving may be executed only when the signal amount of the G pixel is smaller than that of the R pixel.

Alternatively, while a plurality of R-Gr rows are selected, the current selection switches 19r and 19b are turned off. While a plurality of Gb-B rows are selected, the current selection switches 19r are driven to be turned off and the current selection switches 19b are driven to be turned on. With this processing, driving may be executed only when the signal amount of the G pixel is larger than that of the B pixel.

In step S1014, it is determined whether to continuously acquire a next image. If a next image is continuously acquired, the process returns to step S1013; otherwise, the mixing readout mode ends. On the other hand, in step S1015, the current values Iw, Ix, Iy, and Iz of the load constant current sources 18r, 18gb, 18b, and 18gr are assigned to satisfy Is=Iw+(Ix/2) and Is=Iy+(Iz/2). Then, the process transits to step S1016.

In step S1016, the row selection circuit 105 outputs pixel signals in the mixing readout mode, and the current control circuit 104 drives the current selection switches 19r and 19b in switching driving mode 1. The process transits to step S1017. Note that in switching driving mode 1, while the row selection circuit 105 selects a plurality of R-Gr rows, the current selection switches 19r are turned on and the current selection switches 19b are turned off. On the other hand, while the row selection circuit 105 selects a plurality of Gb-B rows, the current selection switches 19r are driven to be turned off and the current selection switches 19b are driven to be turned on.

In step S1017, it is determined whether to continuously acquire a next image. If a next image is continuously acquired, the process returns to step S1016; otherwise, the mixing readout mode ends. On the other hand, in step S1018, the current values Iw and Iy of the load constant current sources 18r and 18b are set to Is. Then, the process transits to step S1019.

In step S1019, the row selection circuit 105 outputs pixel signals in the mixing readout mode, and the current control circuit 104 drives the current selection switches 19r and 19b in switching driving mode 5. The process transits to step S1020. Note that in switching driving mode 5, while the row selection circuit 105 selects a plurality of R-Gr rows or while the row selection circuit 105 selects a plurality of Gb-B rows, the current selection switches 19r and 19b are driven to be turned off.

In step S1020, it is determined whether to continuously acquire a next image. If a next image is continuously acquired, the process returns to step S1019; otherwise, the mixing readout mode ends. Note that if only one of the R/Gb ratio and the B/Gr ratio can be detected in step S1002, the current values of the load constant current sources 18 are assigned according to the driving processing for only the columns of the detectable colors, thereby driving the current selection switches 19. If it is determined to continuously acquire a next image in step S1007, S1010, S1014, S1017, or S1020, the process may transit to step S1001 in consideration of a case in which the R/Gb ratio and B/Gr ratio of the light source change.

In step S1009, it is possible to assign the current values according to the signal amounts of the color filters of three colors by respectively setting, to Iy+Iz, Iy=Iw+Ix, and Iw, the current values of the column output lines at the time of outputting the respective pixel signals when it is determined that the magnitudes of the signal amounts satisfy B>Gr=Gb>R. At this time, if it is preferable to make the electric current consumption equal to that in the normal readout mode, the current values are assigned to satisfy a relationship of 2Is=Iw+Iy+(Ix+Iz)/2.

As described above, it is possible to suppress degradation in image quality at the time of imaging an object having high contrast and high-frequency stripes while suppressing an increase in power consumption by optimizing the current values of the column output lines at the time of mixing and outputting pixel signals in accordance with the magnitudes of the signal amounts of the pixels of the respective colors under various light sources.

Second Embodiment

Figure 5:
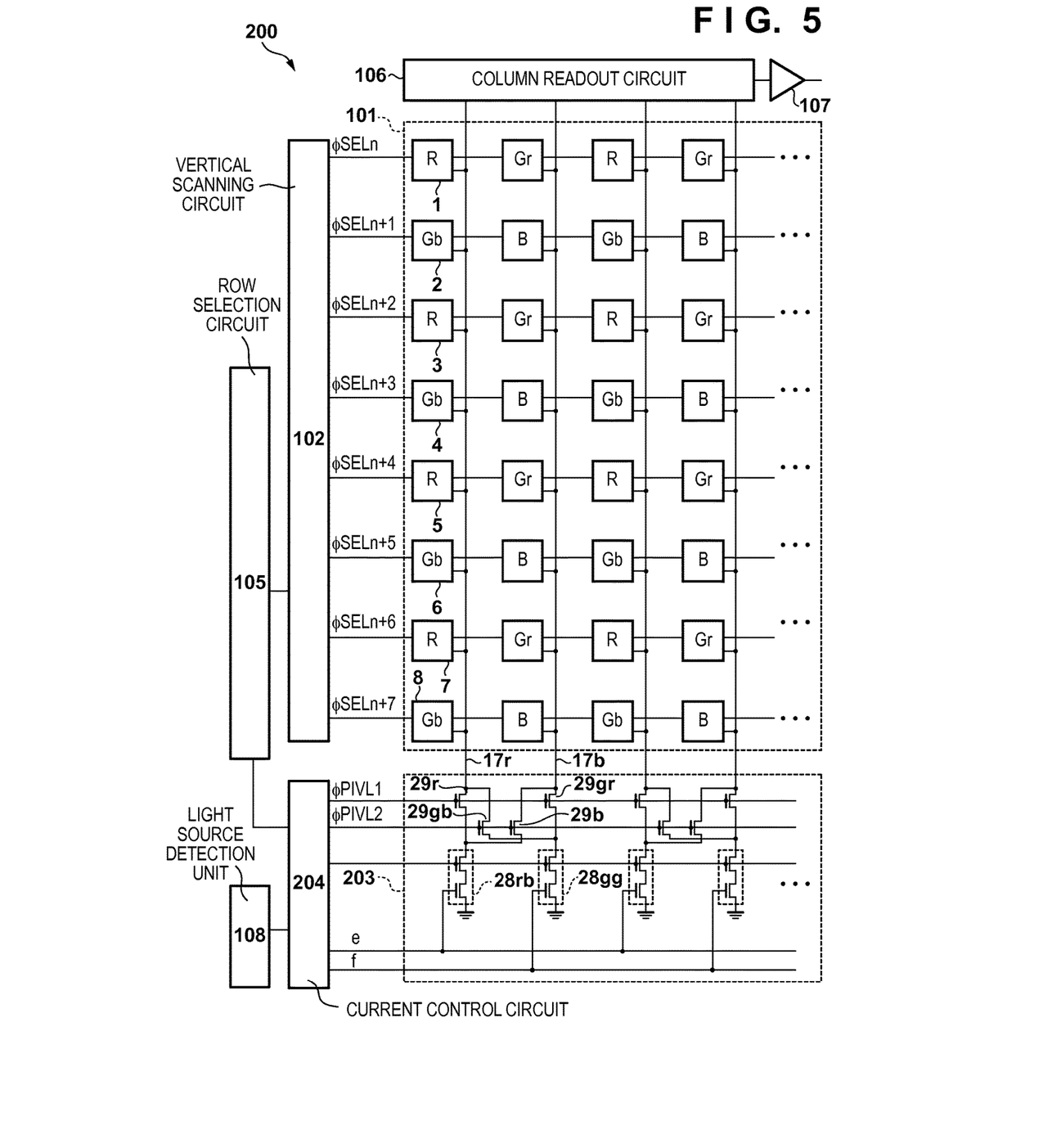
FIG. 5 is a circuit diagram showing the arrangement of a CMOS image sensor according to the second embodiment.
Figure 6:
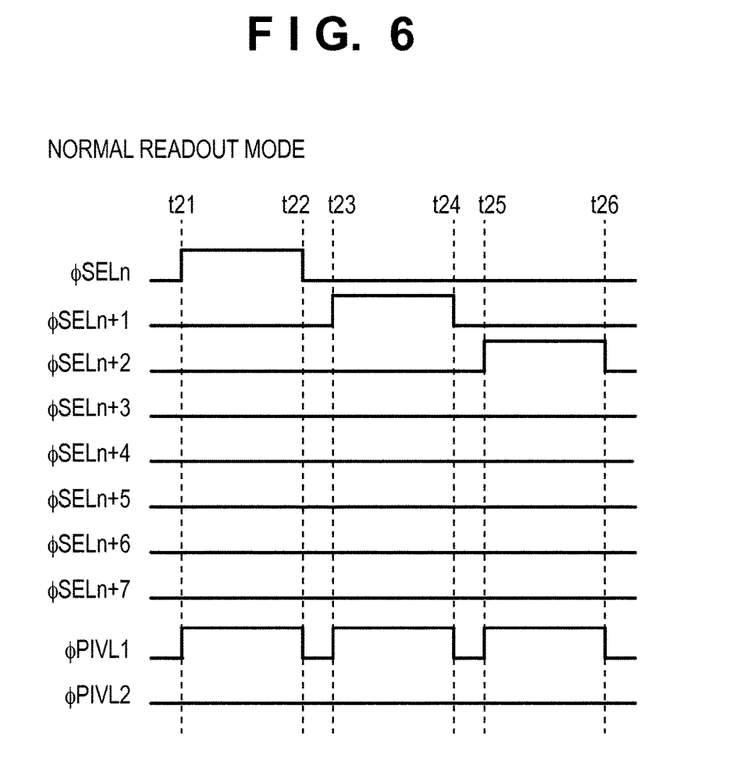
FIG. 6 is a timing chart showing driving of the CMOS image sensor according to the second embodiment.

The second embodiment of the present invention will be described below with reference to FIGS. 5 to 7. FIG. 5 shows the arrangement of a CMOS image sensor 200 according to the second embodiment. The CMOS image sensor 200 according to the second embodiment is the same as in the first embodiment except for a constant current circuit 203 and a current control circuit 204. Only the difference will be described in detail.

The constant current circuit 203 includes two load constant current sources 28rb and 28gg for two column output lines 17r and 17b. The load constant current source 28rb is connected to the column output line 17r via a current selection switch 29r, and connected to the column output line 17b via a current selection switch 29b. The load constant current source 28gg is connected to the column output line 17r via a current selection switch 29gb, and connected to the column output line 17b via a current selection switch 29gr.

The current control circuit 204 supplies a common driving signal φPIVL1 to the current selection switches 29r and 29gr and a common driving signal φPIVL2 to the current selection switches 29gb and 29b, thereby driving the switches. In the normal readout mode, the current control circuit 204 controls the current values of the load constant current sources 28rb and 28gg to an arbitrary value Is via control lines e and f, respectively, thereby tuning off the current selection switches 29gb and 29b. In the mixing readout mode, the current control circuit 204 controls the current values of the load constant current sources 28rb and 28gg to current values Ip and Iq via the control lines e and f, respectively. Note that the current values Ip and Iq are decided according to the output of a light source detection unit 108, similarly to the first embodiment.

The current control circuit 204 drives the current selection switches 29r, 29gb, 29b, and 29gr according to the colors of a row selected by the row selection circuit 105. When the signal φPIVL1 is at high level and the signal φPIVL2 is at low level, the current selection switches 29r and 29gr are turned on, the current selection switches 29gb and 29b are turned off, and the current values flowing through the column output lines 17r and 17b are set to Ip and Iq, respectively. Similarly, when the signal φPIVL1 is at low level and the signal φPIVL2 is at high level, the current selection switches 29r and 29gr are turned off, the current selection switches 29gb and 29b are turned on, and the current values flowing through the column output lines 17r and 17b are set to Iq and Ip, respectively.

In the mixing readout mode, the current control circuit 204 decides the current values Ip and Iq according to an R/Gr ratio and B/Gr ratio obtained by the light source detection unit 108. Note that a case in which the electric current consumption is made equal to that in the normal readout mode by assigning the current values so as to satisfy a relationship of Is=(Ip+Iq)/2 will be described below. The present invention, however, is not limited to this.

A driving example in the normal readout mode using the CMOS image sensor 200 will be explained with reference to FIG. 6.

During a period from time t21 to time t22, a vertical scanning circuit 102 sets a signal φSELn at high level to turn on row selection switches 15 of pixel circuits 1. During this period, the pixel signals of the pixel circuits on the nth row are output to the column output lines 17, and the current control circuit 204 controls the current values of the load constant current sources 28rb and 28gg to Is via the control lines e and f, respectively. During the period from time t21 to time t22, the current control circuit 204 sets the signal φPIVL1 at high level to turn on the current selection switches 29r and 29gr, thereby setting the current values of the column output lines 17r and 17b to Is. The pixel signals output to the column output lines 17 are read out by a column readout circuit 106, and then sequentially read out via a readout amplifier 107.

During a next period from time t23 to time t24, the vertical scanning circuit 102 sets the signal ϕSELn+1 at high level to turn on row selection switches 15 of pixel circuits 2. During this period, the pixel signals of the pixel circuits on the (n+1)th row are output to the column output lines 17, and the current control circuit 204 controls the current values of the load constant current sources 28rb and 28gg to Is via the control lines e and f, respectively. During the period from time 23 to time 24, the current control circuit 204 sets the signal ϕPIVL1 at high level to turn on the current selection switches 29r and 29gr, thereby setting the current values of the column output lines 17r and 17b to Is. After that, the pixel signals of the pixel circuits on the (n+2)th and (n+3)th rows are continuously output in the same manner.

Driving in the mixing readout mode using the CMOS image sensor 200 will be described by using a driving example of mixing output of three pixels. Note that driving in the mixing readout mode is the same as that shown in FIG. 3B and a description will be provided below with reference to FIG. 3B. A case in which the light source detection unit 108 detects the R/Gb ratio and B/Gr ratio both of which are equal to or less than 1 will be explained. Also, a case in which the current control circuit 204 sets the current values Ip and Iq of the load constant current sources 28rb and 28gg so as to satisfy Ip<Iq will be described.

During a period from time t11 to time t12, the vertical scanning circuit 102 sets the signal ϕSELn and signals ϕSELn+2 and ϕSELn+4 at high level to turn on the row selection switches 15 of the pixel circuit 1 and row selection switches 15 of pixel circuits 3 and 5. During this period, the pixel signals of the pixel circuits on the nth, (n+2)th, and (n+4)th rows are mixed and output to the column output lines 17. The current control circuit 204 controls the current values of the load constant current sources 28rb and 28gg to Ip and Iq via the control lines e and f, respectively. During the period from time t11 to time t12, the signal ϕPIVL1 is set at high level to turn on the current selection switches 29r and 29gr, thereby setting the current value of each column output line 17r to Ip and the current value of each column output line 17b to Iq. Note that the pixel signals mixed and output to the column output lines 17 during this period are read out by the column readout circuit 106, and then sequentially read out via the readout amplifier 107.

During a next period from time t13 to time t14, the vertical scanning circuit 102 sets signals ϕSELn+3, ϕSELn+5, and ϕSELn+7 at high level to turn on row selection switches 15 of pixel circuits 4, 6, and 8.

During this period, the pixel signals of the pixel circuits on the (n+3)th, (n+5)th, and (n+7)th rows are mixed and output to the column output lines 17. The current control circuit 204 controls the current values of the load constant current sources 28rb and 28gg to Ip and Iq via the control lines e and f, respectively. During the period from time t13 to time t14, the signal ϕPIVL2 is set at high level to turn on the current selection switches 29gb and 29b, thereby setting the current value of each column output line 17r to Iq and the current value of each column output line 17b to Ip.

After that, in the same manner, the signal ϕPIVL1 is set at high level while the row selection circuit 105 selects a plurality of R-Gr rows, and the signal ϕPIVL2 is set at high level while the row selection circuit 105 selects a plurality of Gb-B rows. By setting Is=(Ip+Iq)/2, the current values of the column output lines 17r and 17b in the mixing readout mode are equal to those in the normal readout mode.

On the other hand, in the mixing readout mode, the input/output linearity of the Gb pixel having a large signal amount is prioritized by controlling the current value Ip at the time of reading out the R pixels with respect to the current value Iq at the time of reading out the Gb pixels so as to satisfy Ip<Iq in accordance with the R/Gb ratio equal to or less than 1. Similarly, in the mixing readout mode, the input/output linearity of the Gr pixel having a large signal amount is prioritized by controlling the current value Ip at the time of reading out the B pixels with respect to the current value Iq at the time of reading out the Gr pixels so as to satisfy Ip<Iq in accordance with the B/Gr ratio equal to or less than 1.

Conversely, even if the current values at the time of reading out the R pixels and B pixels with small signal amounts are decreased, there is a small influence of degradation in image quality. That is, it is possible to suppress an increase in power consumption by assigning the current values at the time of outputting the signals of the Gr or Gb pixels with large signal amounts and the signals of the R or B pixels with small signal amounts, instead of uniformly increasing the current values.

Note that in this embodiment, a case in which Is=(Ip+Iq)/2 is set has been explained. However, an operation of making the current value of each column output line 17 at the time of outputting the signals of the R or B pixels different from that at the time of outputting the signals of the Gr or Gb pixels is the main point of this embodiment. The present invention is not limited to the above relationship.

In the above driving example, a case in which the light source detection unit 108 detects that both the R/Gb ratio and the B/Gr ratio are equal to or less than 1 has been explained. However, the R/Gb ratio and the B/Gr ratio take various values depending on a type of light source or the spectral characteristic of the CMOS image sensor 200. Furthermore, if the signal amount of an image acquired for light source detection is small to the extent that it is impossible to ignore the influence of noise, or is extremely saturated, it may be impossible to detect the R/Gb ratio and B/Gr ratio.

Examples of driving of the current control circuit 204 for various R/Gb ratios and various B/Gr ratios will be described with reference to a flowchart shown in FIG. 7.

Figure 7:
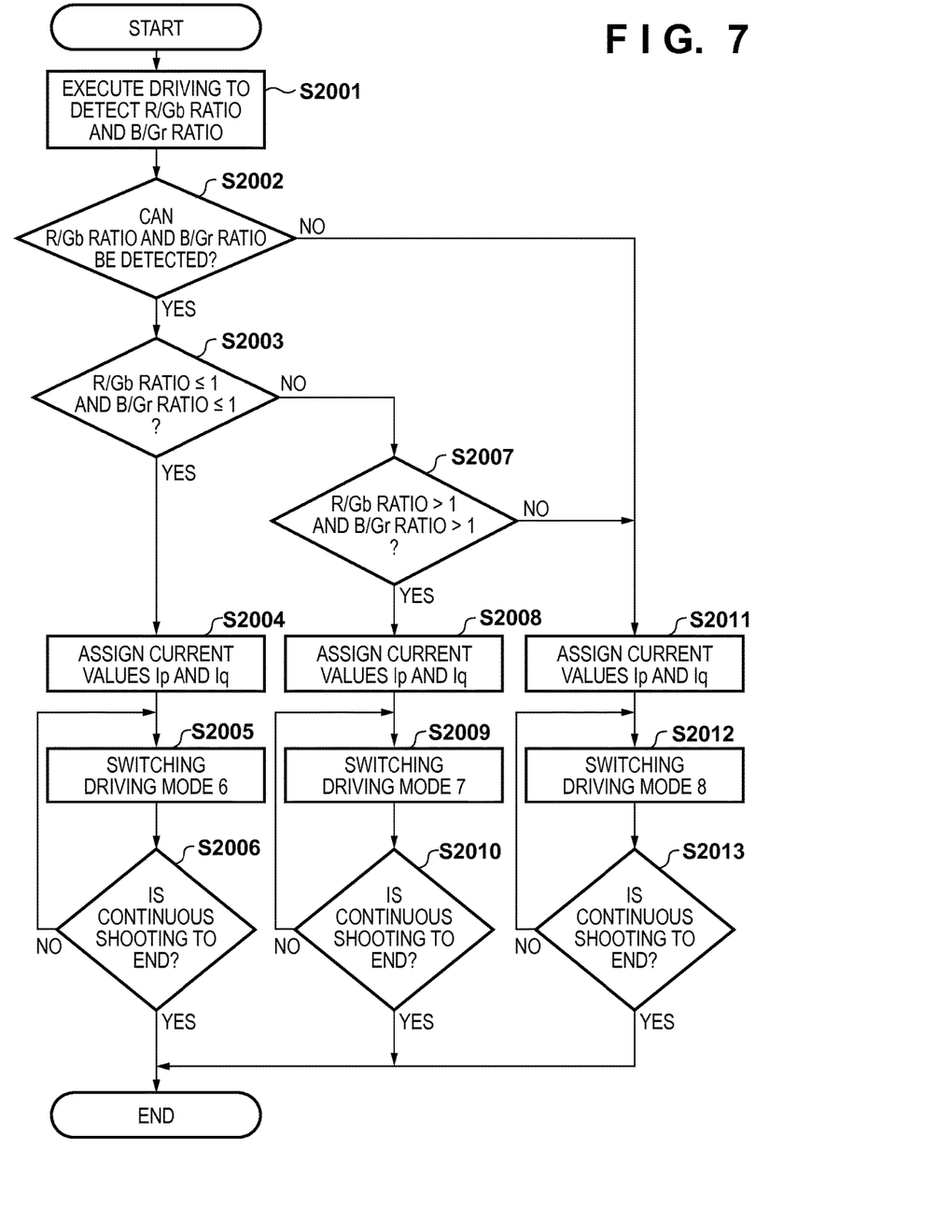
FIG. 7 is a flowchart illustrating control of a current control circuit according to the second embodiment.

FIG. 7 is a flowchart illustrating control of the current values of the column output lines 17 by the current control circuit 204 in accordance with the R/Gb ratio and B/Gr ratio detected by the light source detection unit 108.

In step S2001, the light source detection unit 108 executes driving to acquire the R/Gb ratio and B/Gr ratio. In step S2002, the light source detection unit 108 determines whether the R/Gb ratio and B/Gr ratio of the light source can be detected from an image acquired in step S2001. If it is determined that the R/Gb ratio and B/Gr ratio can be detected, the process transits to step S2003; otherwise, the process transits to step S2011.

In step S2003, it is determined whether both the detected R/Gb ratio and B/Gr ratio of the light source are equal to or less than 1. If both the R/Gb ratio and B/Gr ratio are equal to or less than 1, that is, the signal amounts of the Gb and Gr pixels are larger than those of the R and B pixels, respectively, the process transits to step S2004; otherwise, the process transits to step S2007.

In step S2004, the current values Ip and Iq of the load constant current sources 28rb and 28gg are assigned to satisfy Ip<Iq and Is=(Ip+Iq)/2, and the process transits to step S2005. In step S2005, the row selection circuit 105 outputs pixel signals in the mixing readout mode, and the current control circuit 204 drives the current selection switches 29r, 29gr, 29gb, and 29b in switching driving mode 6. The process transits to step S2006.

Note that in switching driving mode 6, while the row selection circuit 105 selects a plurality of R-Gr rows, the current selection switches 29r and 29gr are driven to be turned on and the current selection switches 29gb and 29b are driven to be turned off. On the other hand, while the row selection circuit 105 selects a plurality of Gb-B rows, the current selection switches 29r and 29gr are driven to be turned off and the current selection switches 29gb and 29b are driven to be turned on.

In step S2006, it is determined whether to continuously acquire a next image. If a next image is continuously acquired, the process returns to step S2005; otherwise, the mixing readout mode ends.

On the other hand, in step S2007, it is determined whether both the detected R/Gb ratio and B/Gr ratio of the light source are larger than 1. If both the R/Gb ratio and B/Gr ratio are larger than 1, that is, the signal amounts of the Gb and Gr pixels are smaller than those of the R and B pixels, respectively, the process transits to step S2008; otherwise, the process transits to step S2011.

In step S2008, the current values Ip and Iq of the load constant current sources 28rb and 28gg are assigned to satisfy Ip<Iq and Is=(Ip+Iq)/2, and the process transits to step S2009. In step S2009, the row selection circuit 105 outputs pixel signals in the mixing readout mode, and the current control circuit 204 drives the current selection switches 29r, 29gr, 29gb, and 29b in switching driving mode 7. The process transits to step S2010.

Note that in switching driving mode 7, while the row selection circuit 105 selects a plurality of R-Gr rows, the current selection switches 29r and 29gr are driven to be turned off and the current selection switches 29gb and 29b are driven to be turned on. On the other hand, while the row selection circuit 105 selects a plurality of Gb-B rows, the current selection switches 29r and 29gr are driven to be turned on and the current selection switches 29gb and 29b are driven to be turned off.

In step S2010, it is determined whether to continuously acquire a next image. If a next image is continuously acquired, the process returns to step S2009; otherwise, the mixing readout mode ends. On the other hand, in step S2011, the current values Ip and Iq of the load constant current sources 28rb and 28gg are set to Is, thereby transiting to step S2012.

In step S2012, the row selection circuit 105 outputs pixel signals in the mixing readout mode, and the current control circuit 204 drives the current selection switches 29r, 29gr, 29gb, and 29b in switching driving mode 8. The process transits to step S2013. Note that in switching driving mode 8, while the row selection circuit 105 selects a plurality of R-Gr rows or while the row selection circuit 105 selects a plurality of Gb-B rows, the current selection switches 29r and 29gr are driven to be turned on and the current selection switches 29gb and 29b are driven to be turned off.

In step S2013, it is determined whether to continuously acquire a next image. If a next image is continuously acquired, the process returns to step S2012; otherwise, the mixing readout mode ends. Note that if it is determined to continuously acquire a next image in step S2006, S2010, or S2013, the process may transit to step S2001 in consideration of a case in which the R/Gb ratio and B/Gr ratio of the light source change.

As described above, it is possible to suppress degradation in image quality at the time of imaging an object having high contrast and high-frequency stripes while suppressing an increase in power consumption by optimizing the current amounts of the column output lines at the time of mixing and outputting pixel signals in accordance with the magnitudes of the signal amounts of the pixels of respective colors under the light source. Although the constant current circuit 103 according to the first embodiment includes two load constant current sources for each pixel column, the constant current circuit 203 includes one load constant current source for each pixel column, and it is therefore possible to suppress the circuit scale.

Third Embodiment

Figure 8:
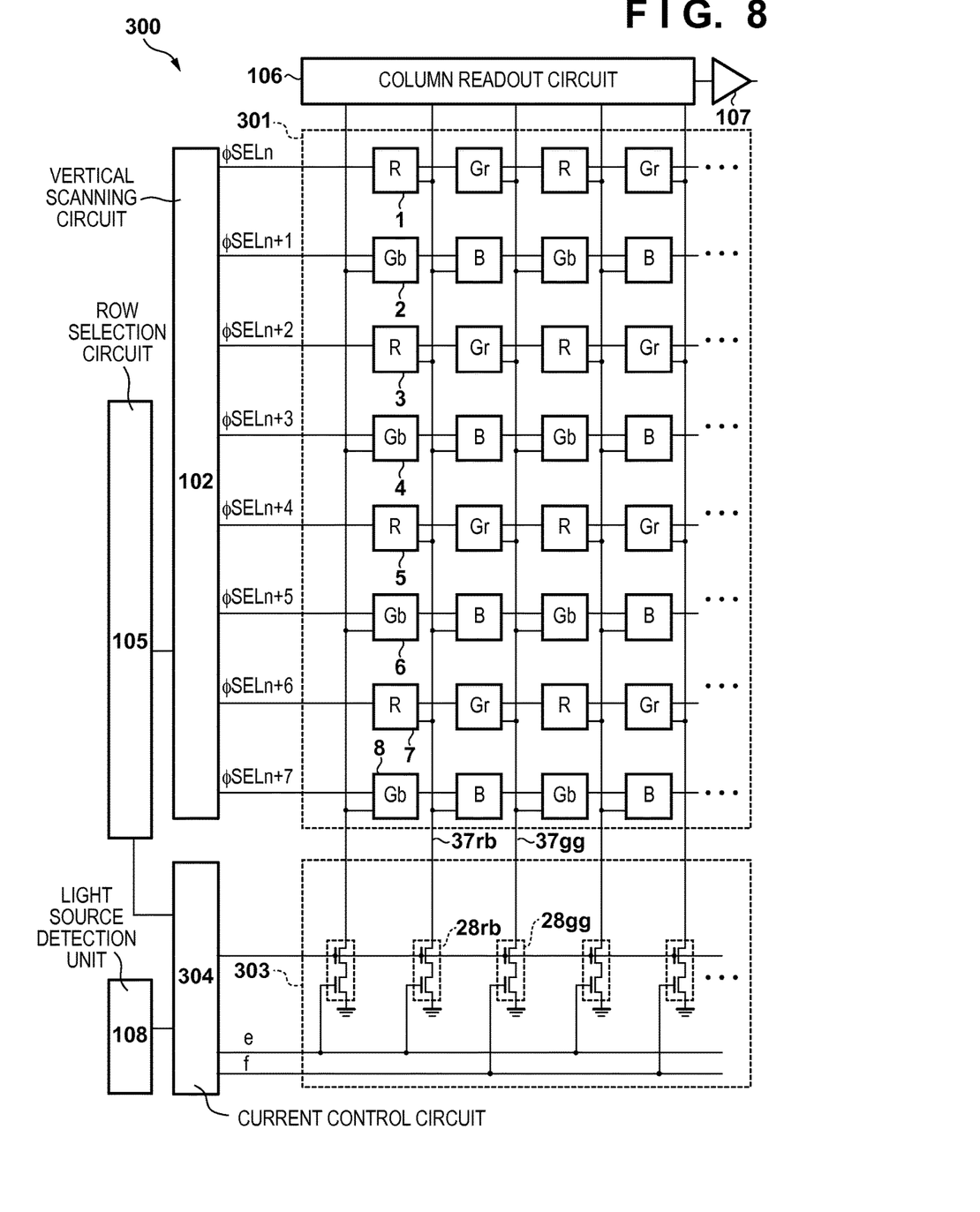
FIG. 8 is a circuit diagram showing the arrangement of a CMOS image sensor according to the third embodiment.

The third embodiment of the present invention will be described with reference to FIG. 8. FIG. 8 shows the arrangement of a CMOS image sensor 300 according to the third embodiment. The difference from the second embodiment is that among the pixel circuits of a pixel array 301 shown in FIG. 8, R pixel circuits on the first column from the left and B pixel circuits on the second column from the left share one column output line 37rb. Similarly, Gr pixel circuits on the second column from the left and Gb pixel circuits on the third column from the left share one column output line 37gg.

A constant current circuit 303 includes one load constant current source 28rb for each column output line 37rb, and one load constant current source 28gg for each column output line 37gg. The load constant current source 28rb is connected to the column output line 37rb, and the load constant current source 28gg is connected to the column output line 37gg.

In the normal readout mode, a current control circuit 304 controls the current values of the load constant current sources 28rb and 28gg to an arbitrary value Is via control lines e and f, respectively. In the mixing readout mode, the current control circuit 304 controls the current values of the load constant current sources 28rb and 28gg to current values Ip and Iq via the control lines e and f.

The current control circuit 304 decides the current values Ip and Iq according to an R/Gb ratio and B/Gr ratio obtained by a light source detection unit 108 in the mixing readout mode. Note that a case in which the electric current consumption is made equal to that in the normal readout mode by assigning the current values so as to satisfy a relationship of Is=(Ip+Iq)/2 will be described below. The present invention, however, is not limited to this.

Note that pixel signals mixed and output to the respective column output lines 37 are read out by a column readout circuit 106, and then sequentially read out via a readout amplifier 107. When generating an image from the readout signals, it is necessary to generate an image by considering that a readout timing shifts by one pixel in the horizontal direction for each row.

When the light source detection unit 108 detects that both the R/Gb ratio and the B/Gr ratio are equal to or less than 1, Ip<Iq is set. When the light source detection unit 108 detects that both the R/Gb ratio and the B/Gr ratio are larger than 1, Ip>Iq is set.

On the other hand, when the R/Gb ratio and the B/Gr ratio do not satisfy either of the above conditions, that is, the magnitudes of the signal amounts satisfy R>Gb and Gr>B or B>Gr and Gb>R, Ip=Is and Iq=Is are set. Alternatively, the product of the R/Gb ratio and the B/Gr ratio is obtained and set as an RB/GrGb ratio. If the RB/GrGb ratio is equal to or less than 1, Ip<Iq may be set; otherwise, Ip>Iq may be set. Alternatively, if the magnitudes of the signal amounts satisfy R>Gb and Gr>B or B>Gr and Gb>R, Ip>Iq may be set to assign the highest priority to the input/output linearity of the R pixel or B pixel with a largest signal amount.

According to this embodiment, it is possible to set different current values of the column output lines at the time of mixing and outputting pixel signals for the R and B pixels and the Gr and Gb pixels without requiring current selection switches and switching driving processing therefor.

As described above, it is possible to suppress degradation in image quality at the time of imaging an object having high contrast and high-frequency stripes while suppressing an increase in power consumption by optimizing the current values of the column output lines at the time of mixing and outputting pixel signals in accordance with the magnitudes of the signal amounts of the pixels of respective colors under the light source.

Fourth Embodiment

Figure 9:
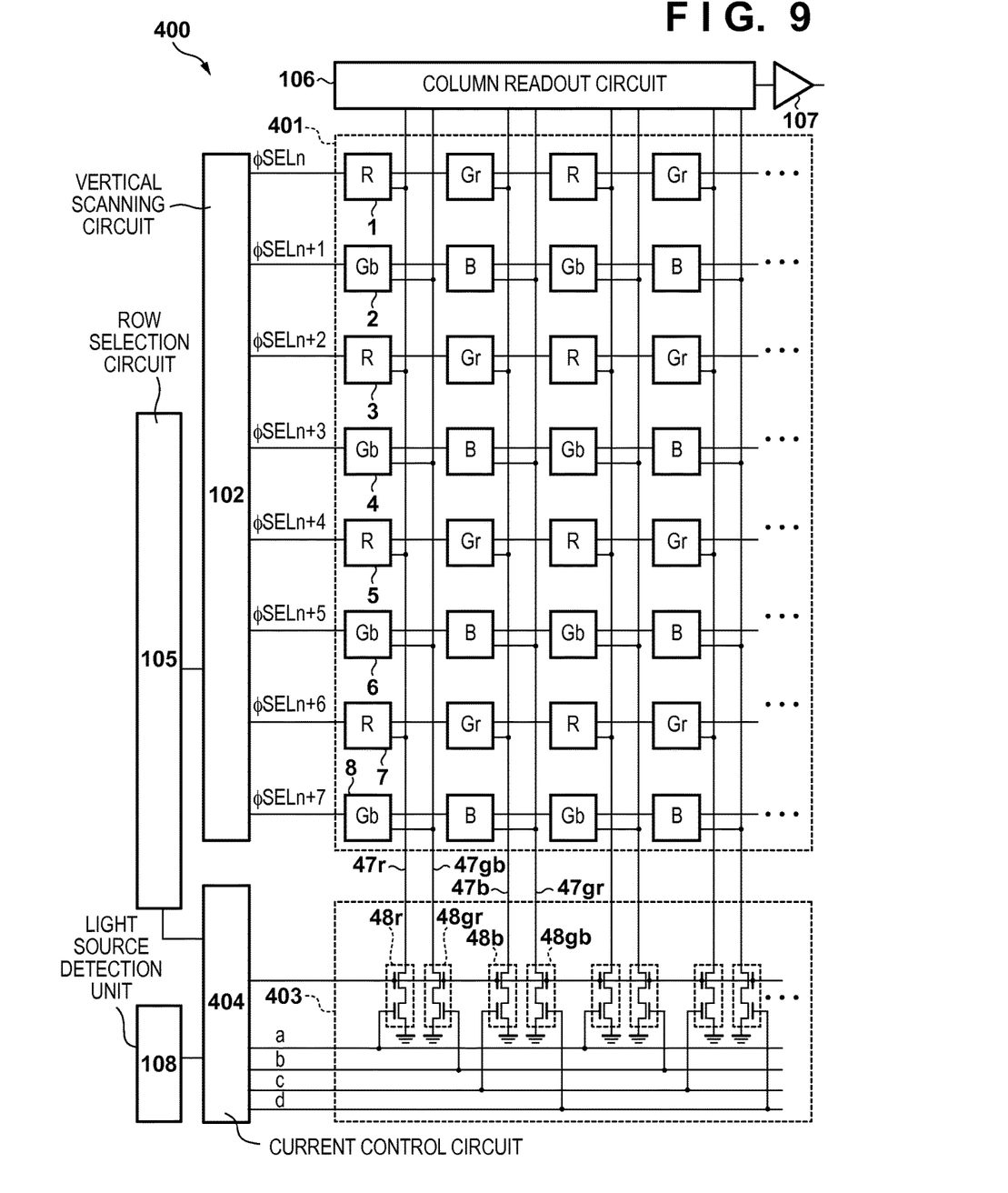
FIG. 9 is a circuit diagram showing the arrangement of a CMOS image sensor according to the fourth embodiment.

The fourth embodiment of the present invention will be described with reference to FIG. 9. FIG. 9 shows the arrangement of a CMOS image sensor 400 according to the fourth embodiment. The difference from the third embodiment is that two column output lines are provided for each pixel column and pixel circuits of each of colors R, Gr, Gb, and B share a different column output line.

Referring to FIG. 9, R pixel circuits are connected to a column output line 47r. Similarly, Gr, Gb, and B pixel circuits are connected to column output lines 47gr, 47gb, and 47b, respectively. A constant current circuit 403 includes one load constant current source 48r, 48gr, 48gb, or 48b for each column output line 47r, 47gr, 47gb, or 47b. Each of the load constant current sources 48r, 48gr, 48gb, and 48b is connected to a corresponding one of the column output lines 47r, 47gr, 47gb, or 47b.

In the normal readout mode, a current control circuit 404 controls the current values of the load constant current sources 48b, 48gr, 48gb, and 48b to an arbitrary value Is via control lines a, b, c, and d, respectively. In the mixing readout mode, the current control circuit 404 controls the current values of the load constant current sources 48b, 48gr, 48gb, and 48b to current values Ir, Igr, Igb, and Ib via the control lines a, b, c, and d, respectively.

The current control circuit 404 decides the current values Ir, Igr, Igb, and Ib according to an R/Gb ratio and B/Gr ratio obtained by a light source detection unit 108 in the mixing readout mode. Note that it is possible to make the electric current consumption equal to that in the normal readout mode by assigning the current values so as to satisfy a relationship of Is=(Ir+Igr+Igb+Ib)/4. The present invention, however, is not limited to this.

For example, if the output ratio of the R, Gr, Gb, and B pixels obtained by the light source detection unit 108 is Gr=Gb>R>B, the current control circuit 404 accordingly assigns the current values so as to satisfy Igr=Igb>Ir>Ib. Alternatively, if the output ratio of the R, Gr, Gb, and B pixels is R>Gr>Gb>B, the current control circuit 404 accordingly assigns the current values so as to satisfy Ir>Igr>Igb>Ib.

By providing the column output lines and load constant current sources for the respective colors R, Gr, Gb, and B, it is possible to set different current values of the column output lines at the time of mixing and outputting pixel signals for the respective colors without requiring current selection switches and switching driving processing therefor.

As described above, it is possible to suppress degradation in image quality at the time of imaging an object having high contrast and high-frequency stripes while suppressing an increase in power consumption by optimizing the current amounts of the column output lines at the time of mixing and outputting pixel signals in accordance with the magnitudes of the signal amounts of the pixels of respective colors under the light source.

A case in which the colors of the color filters are R, Gr, Gb, and B has been described above. However, for example, color filters of four colors R, G, W, and B may be possible. In this case, for example, when the magnitudes of signal amounts satisfy W>G>R>B, it is only necessary to set the current values of column output lines at the time of outputting corresponding pixel signals in the order of W>G>R>B.

The preferred embodiments of the present invention have been described above. The present invention, however, is not limited to them, and various modifications and changes can be made within the spirit and scope of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-087596, filed Apr. 21, 2014, which is hereby incorporated by reference herein in its entirety.

What is claimed is:
1. A solid-state imaging apparatus comprising:
a pixel array in which a plurality of pixels each outputting a photo-electrically converted signal are arrayed two-dimensionally, and a color filter is provided in each of the plurality of pixels;

a plurality of column output lines provided for each column of the pixel array;

a current source which supplies a current to each of the plurality of column output lines; and a controller which controls current values of the plurality of column output lines to differ for respective colors of the color filters in a case where the signals of the plurality of pixels with the color filters of the same color arranged on same column are simultaneously output to each of the plurality of column output lines so as to be combined.

2. The apparatus according to claim 1, wherein the current source includes a first current source and a second current source.

3. The apparatus according to claim 2, further comprising:

a selection switch which switches between connection and non-connection between each of the plurality of column output lines and a corresponding one of the second current sources, wherein the controller controls switching of the selection switches according to the colors of the color filters of the pixels.

4. The apparatus according to claim 1, wherein in the pixel array, pixels with a first color filter and pixels with a second color filter on are adjacent column share one of the plurality of column output lines.

5. A method of controlling a solid-state imaging apparatus including a pixel array in which a plurality of pixels each outputting a photo-electrically converted signal are arrayed two-dimensionally and a color filter is provided in each of the plurality of pixels, a plurality of column output lines provided for each column of the pixel array, and a current source which supplies a current to each of the plurality of column output lines, the method comprising:

controlling current values of the plurality of column output lines to differ for respective colors of the color filters in a case where the signals of the plurality of pixels with the color filters of the same color arranged on same column are simultaneously output to each of the plurality of column output lines so as to be combined.

6. The method according to claim 5, wherein the current source includes a first current source and a second current source.

7. The method according to claim 6, wherein the solid-state imaging apparatus further includes a selection switch which switches between connection and non-connection between each of the plurality of column output lines and a corresponding one of the second current sources, and wherein in the controlling, switching of the selection switches is controlled according to the colors of the color filters of the pixels.

8. The method according to claim 5, wherein in the pixel array, pixels with a first color filter and pixels with a second color filter on an adjacent column share one of the plurality of column output lines.

* * * * *